(No Model.)
L. C. DAVIDSON.
KETTLE FOR CALCINING GYPSUM.
No. 413,496. Patented Oct. 22, 1889.
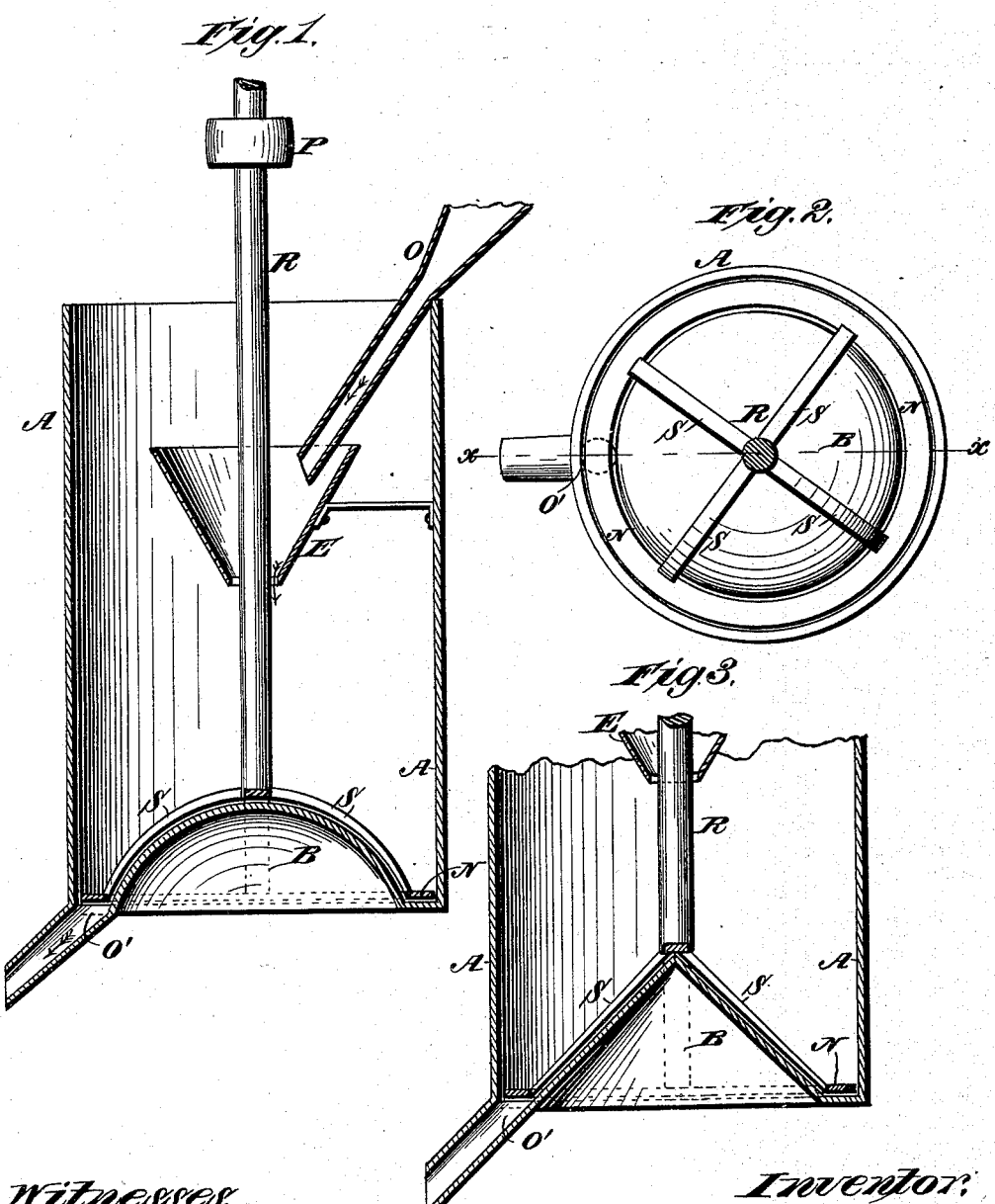

UNITED STATES PATENT OFFICE.

LEWIS C. DAVIDSON, OF GRAND RAPIDS, MICHIGAN.

KETTLE FOR CALCINING GYPSUM.

SPECIFICATION forming part of Letters Patent No. 413,496, dated October 22, 1889.

Application filed June 22, 1889. Serial No. 315,191. (No model.)

*To all whom it may concern:*

Be it known that I, LEWIS C. DAVIDSON, a citizen of the United States, residing at the city of Grand Rapids, in the county of Kent and State of Michigan, have invented a certain new and useful Kettle for Calcining Gypsum, of which the following is a specification.

My invention relates to a kettle for calcining gypsum by means of artificial heat.

The objects of my invention are, first, to convert the raw gypsum into calcined gypsum or stucco by a continuous drying process, the raw material being continually fed to the kettle and the calcined material taken therefrom without necessitating a stoppage of the operation, and, second, to economize fuel and cheapen the production of calcined gypsum or plaster. These objects I accomplish by means of the mechanism illustrated in the accompanying drawings, in which—

Figure 1 is a vertical sectional view of my newly-invented kettle for calcining gypsum on line $x\ x$ of Fig. 2. Fig. 2 is a plan view of the same with the hopper removed. Fig. 3 is a vertical sectional view of a modified form of a support of the kettle.

Similar letters refer to similar parts throughout the several views.

A A represent the side walls of the kettle, which are preferably perpendicular.

B represents the bottom of the kettle, which is curved or inclined upward, being highest at the center and provided with a narrow part near the outer edge of the kettle, which is preferably horizontal. In Fig. 1 I have shown the bottom of the kettle concave and convex above. In Fig. 3 I have shown the bottom of the kettle conical. The exact form of the bottom is not material, provided it has an upward inclination at the center from beneath, the object of this inclination being to provide a large space for the direct action of the heat beneath the kettle and an inclined surface within the kettle, which will cause the ground gypsum as it falls from the hopper to move gradually outward toward the periphery of the kettle. At one side of the kettle-bottom I provide an opening, (shown by O',) and at or near the top of the kettle I provide an inlet-spout for receiving the raw gypsum, which is shown in the drawings by O.

N N is an annular plate or ring supported by arms S S, which arms are in turn supported by the central shaft R, the shaft being revolved by any suitable machinery, and inasmuch as I make no claim upon the machine which operates the shaft R, I have not shown any part thereof, except a pulley P upon the shaft. Of course this shaft can be revolved by belting, pulleys, gearing, or any other well-known mchanism. The annular plate or ring N is in close contact with the inner periphery of the kettle, and moves in close proximity to the bottom of the kettle. The arms S S are preferably made parallel with the inclined portion of the kettle-bottom.

E E represents a hopper, which surrounds the shaft R and conveys the raw material so that it drops down near the center of the kettle-bottom.

The operation of my invention is as follows: The raw gypsum is fed through the tube or inlet O into the hopper E, from which it is conveyed through the opening in the bottom of the hopper to the bottom of the kettle. The hopper may extend in close contact with the shaft, and the shaft may be provided, if found desirable, with mechanism for automatically forcing the raw gypsum from the hopper. The gypsum drops from the hopper upon the inclined kettle-bottom, and moves outwardly until it reaches the inner periphery or walls of the kettle. The annular plate N revolves in close proximity to the kettle-bottom, allowing only a very small portion of the gypsum between such plate and the kettle-bottom; and the arms S S move also in close proximity to the kettle-bottom, continually stirring the ground gypsum and allowing the moisture to pass freely from the gypsum up through the open top of the kettle, and by the time the gypsum has found its way down along the inclined bottom until it is acted upon by the annular plate N it is found to be sufficiently calcined to be removed from the opening O', the movement of the annular plate or ring N and the arms S S being such as to move the gypsum down the inclined bottom and from thence out of the opening O' in a continuous stream, enabling me by this invention to keep up a continuous process in the calcining of gypsum, and at the same time to remove the water very rapidly and at very little expense.

The kettle above described is adapted to be used with all kinds of fuel.

Having thus described my invention, what I claim to have invented, and desire to secure by Letters Patent, is—

1. In a kettle for calcining gypsum, the combination of the kettle-bottom having a circular portion horizontal, or nearly so, and a central upper inclined portion rising from said horizontal portion, an annular plate or ring adapted to revolve within the kettle and in close contact to the inner horizontal surface of the kettle-bottom, arms within the kettle connecting said annular plate with the central shaft, a central shaft, and suitable mechanism for revolving said annular plate or ring, substantially as described.

2. In a kettle for calcining gypsum, the combination of a kettle-bottom having an upwardly-inclined under surface, a plate or ring adapted to travel near the inner periphery of the kettle and in close proximity to the bottom of the kettle, arms connecting said annular ring or plate to the central shaft, said arms adapted to travel in close proximity to the inclined portion of the kettle-bottom, and a shaft adapted to support said arms and annular plate or ring and convey motion to the same, substantially as described.

3. In a kettle for calcining gypsum, the combination of the kettle-bottom having an upwardly-inclined under side, an annular plate or ring adapted to travel near the inner periphery of the kettle and in close proximity to the kettle-bottom, arms connecting the annular plate or ring to the central shaft, a central shaft adapted to support the arms and ring, suitable mechanism for giving a rotary motion to said shaft, an outlet for the escape of the calcined material at or near the bottom of said kettle, and an inlet near the top.

4. In a kettle for calcining gypsum, the combination of the inclined bottom, the annular plate or ring, the arms constructed as above described, a central shaft supporting the arms, the inlet spout or pipe, and a hopper, through which the central shaft passes, having a discharge near the central portion, substantially as described.

In witness whereof I have hereunto set my hand and seal in the presence of two witnesses.

LEWIS C. DAVIDSON. [L. S.]

Witnesses:
HUGH E. WILSON,
HARRY P. VAN WAGNER.